(12) United States Patent
McKay

(10) Patent No.: US 7,052,600 B2
(45) Date of Patent: May 30, 2006

(54) APPARATUS FOR TREATING WATER

(75) Inventor: Scott McKay, San Antonio, TX (US)

(73) Assignee: Enproamerica, Inc., San Antonio, TX (US)

( * ) Notice: Subject to any disclaimer, the term of this patent is extended or adjusted under 35 U.S.C. 154(b) by 0 days.

(21) Appl. No.: 09/818,272

(22) Filed: Mar. 27, 2001

(65) Prior Publication Data

US 2002/0014460 A1   Feb. 7, 2002

Related U.S. Application Data

(63) Continuation-in-part of application No. 09/263,697, filed on Mar. 5, 1999, now Pat. No. 6,207,060.

(51) Int. Cl.
C02F 1/467 (2006.01)

(52) U.S. Cl. ............... 210/167; 204/248; 204/269; 204/292; 210/143; 210/192; 210/199; 210/205; 261/DIG. 11; 426/66; 426/532

(58) Field of Classification Search ............... 204/248, 204/267, 269, 292, 293; 205/746, 745, 743, 205/751, 752, 759; 210/748, 167, 192, 198.1, 210/205, 199, 143; 426/66, 67, 532
See application file for complete search history.

(56) References Cited

U.S. PATENT DOCUMENTS

| 3,092,566 A | 6/1963 | Negus ............. 204/152 |
| 3,752,747 A | 8/1973 | Treharne et al. ........ 204/149 |
| 3,936,364 A * | 2/1976 | Middle ................ 426/66 |
| 3,992,146 A | 11/1976 | Fazzalari .............. 21/58 |
| 4,038,163 A | 7/1977 | Casanovas et al. ....... 204/149 |
| 4,161,435 A | 7/1979 | Moeglich ............. 204/152 |
| 4,172,786 A | 10/1979 | Humphrey et al. ....... 210/57 |
| 4,263,114 A | 4/1981 | Shindell .............. 204/149 |
| 4,492,618 A | 1/1985 | Eder ................. 204/152 |
| 4,649,866 A * | 3/1987 | Shomer ............... 119/75 |
| 4,790,946 A * | 12/1988 | Jansen ............... 210/748 |
| 4,861,489 A | 8/1989 | Swift et al. ........... 210/668 |
| 5,007,994 A | 4/1991 | Snee ................. 204/240 |
| 5,167,777 A | 12/1992 | Kaczur et al. .......... 204/152 |
| 5,173,092 A | 12/1992 | Rudder ................ 55/53 |
| 5,245,111 A | 9/1993 | Betz ................. 204/152 |
| 5,314,589 A | 5/1994 | Hawley .............. 204/152 |
| 5,603,843 A | 2/1997 | Snee ................. 210/748 |
| 6,207,060 B1 * | 3/2001 | McKay ............... 210/696 |
| 6,409,895 B1 * | 6/2002 | Ponzano .............. 204/260 |
| 6,517,713 B1 * | 2/2003 | Gargas ............... 210/192 |

FOREIGN PATENT DOCUMENTS

WO     98/31636     7/1998

* cited by examiner

*Primary Examiner*—Peter A. Hruskoci
(74) *Attorney, Agent, or Firm*—Vidas, Arrett & Steinkraus PA

(57) ABSTRACT

The inventive method and apparatus for treating water and water systems. The apparatus and method also assures the retention of calcium in drinking water provided to an animal by suppling water to a water feed line which is connected to a drinking device, oxidizing the water to retain calcium in the water in solution, ionizing the water using copper/zinc electrodes, the ionization sanitizing the water and providing residual copper and zinc ions which act as an algicide and a biocide, and providing the ionized oxidized drinking water which retains calcium in solution to the animal for drinking.

20 Claims, 11 Drawing Sheets

APPARATUS FOR TREATING WATER

CROSS-REFERENCE TO RELATED APPLICATIONS

The present application is a Continuation-in-Part application of U.S. application Ser. No. 09/263,697, filed Mar. 5, 1999, now U.S. Pat. No. 6,207,060, which is incorporated herein by reference in its entirety.

BACKGROUND OF THE INVENTION

Applicant has previously invented apparatus for the treatment of cooling tower water to control scale, corrosion and biofilm, using electronic oxidation and ionization apparatus. The national stage of this invention, PCT/US97/00885, is U.S. application Ser. No. 08/983376, with an international filing date of Jan. 17, 1997, and the entire contents of this application are hereby incorporated by reference. The electronic oxidation and ionization apparatus is further disclosed in U.S. Pat. Nos. 5,007,994 and 5,603,843, the entire contents of which are hereby incorporated by reference. A divisional of U.S. Pat. No. 5,603,843 is U.S. application Ser. No. 09/252389, the entire contents of which are hereby incorporated by reference.

Condensing water loops are well known and used as coolant or mass heat transfer systems for such things as power plants. Generally, water loops comprise a cooling tower, a condenser system and a pump. In refrigeration cycles using condensing water loops, the function of the cooling tower is to cool condenser water after it has removed heat from the refrigerant in the condenser. In industrial processes, the condenser has the burden of condensing chemical products over a given temperature range from vapor to condensate. In power plants, the condensing water is used to draw heat from the spent steam driving the turbines. The cooling tower in each of these applications is a mass heat transfer device. In refrigeration and air conditioning systems, the colder the water is entering the condenser, the less energy required to power compressors on the refrigerant side of the condenser. In chemical product manufacturing, the colder the water, the more efficient the condensation process and therefore the greater the volume of product produced at a lower cost. In electrical power generation, the warmer the water, the less efficient the power generation, thereby depriving the facility of additional power sales. In all applications, the less fouling on the cooling tower surfaces and in the waterside condensing tubes, the more efficient, economical and long lasting the system will be.

Water in a condensing loop draws heat from the refrigerant/chemical product/steam as it passes through the condenser. In the cooling tower, the heated water is cooled by evaporation and the mixing of cooler make-up water. Cooling towers come in various types and sizes. For example, there are atmospheric towers, hyperbolic natural draft towers, counter flow and cross flow natural draft towers, mechanical draft towers using either forced draft or induced draft, and hybrid draft towers which are fan assisted natural draft towers. The common element in each is a reduction in temperature of the condensing water coming off the condenser and returning the water to the condenser as close to the design temperature as possible. In all types of cooling towers (except dry towers) evaporation is the means of cooling the water. The towers are designed to expose the maximum transient water surface to the maximum air flow for the longest possible period of time. As a result, a portion of the water in the loop is lost in this process when it is discharged into the atmosphere as hot moist vapor (the "plume"). The cooling tower is a device that takes heat out of the circulating water and discharges the heat into the atmosphere. Water volume lost in this process is replaced by new water introduced into the basin of the cooling tower by means of make-up water piping to maintain a constant volume of water in the system.

Description of the Water Chemistry of Condensing Water Loops:

A description of the water chemistry of the condensing water loop has three components. The first component is the water chemistry of the make-up water. The source of the water will determine some of the dissolved solids and gases, colloidal solids, and suspended solids in the condensing water loop. Typical among these are dissolved forms of carbon dioxide (carbonic acid, bicarbonate ion and carbonate ion), calcium, sulfates, silica, chlorine or bromine compounds from purification efforts, nitrogen compounds, dissolved oxygen and hydrogen sulfide, and the hydrated oxides of iron and manganese (See Table 1). If the make-up is treated waste water or reused process water, it may also contain phosphates. Another source of the make-up water may be treated or untreated ground water or lake water.

TABLE 1

| Common Ions Found in Make-up Water | | | |
| --- | --- | --- | --- |
| calcium | Ca++ | bicarbonates | $HCO_3^-$ |
| magnesium | Mg++ | chloride | $Cl^-$ |
| sodium | Na+ | sulfate | $SO_4^-$ |
| iron | Fe++ | nitrate | $NO_4^-$ |
| manganese | Mn++ | carbonate | $CO_4^-$ |
| copper | Cu++ | phosphate | $PO_4^-$ |

The second component in the water chemistry is the air borne particles and gases in the ambient air. The design and function of cooling towers insures that the water circulating through them will scrub gases and particles from the air passing through the tower. In addition to the normal atmospheric gases, the ambient air may also contain sulphur dioxide and ammonia. Solids of silts (silica), salts, clays (alumina), ash, and organic solids such as pollen, leaves, molds, bacteria, and spores of other living organisms are also contained in the ambient air.

The third source of components for water chemistry of the water in the condensing loop is the piping, valves, pumps, and equipment (including the condenser, tower, and basin) with which the water comes in contact while circulating. Also included in this component, are the chemical or organic compounds added to the water to control scale and corrosion. Condensing water loop piping is usually a system incorporating several different metals, including mild steel, brass, copper, stainless and galvanized steel. The cooling tower often will have pressure treated woods, concrete, plastic, and asbestos that will contact the water as it circulates. Salts, liquids or gases of chlorine or bromine, chromate compounds, and magnesium compounds may be added to the water to control bacteria, algae, corrosion or scale. Since the water is the closest to a universal solvent, it will tend to dissolve a little of almost everything it comes in contact with. This leads to corrosion of system piping, valves and equipment creating compounds of zinc, copper, nickel and iron rust, leaching of arsenic and other compounds out of the cooling tower surfaces, and dissolving calcium compounds from concrete basins. As the water evaporates, the solids remain, increasing their concentration in the circulating water. The increased concentration accelerates corrosion, and coats the system's piping, valves and equipment. The heavier dissolved particles will settle out, primarily in the cooling tower basin and sump, but also in low pressure or restricted areas in the loop.

The accumulation of concentrated solids from the combined effects of evaporation, air scrubbing, leaching and corrosion together with the additive additions leads to a condition called "fouling." The damp, warm, and dark conditions in the cooling tower and the basin leads to the rapid growth of algae, bacteria, fungus, and other organic compounds generally and commonly referred to as "biofilm." The circulating water is rich in dissolved oxygen and other nutrients to further enhance the growth and spread of the biofilm. The biofilm tends to trap and hold the solids in the circulating water. This mass, when it settles to the bottom of the basin and the sump, becomes an insoluble and restricting sludge. Also, since some of the solids are the product of air borne pollution and the result of chemicals used for attempting to control biofilm, fouling, scale and corrosion, the sludge can contain potentially toxic levels of chemical compounds.

Description of Scale and Corrosion in the Condensing Loop System:

Scale, while being only one of the deposits that may form and be found on surfaces of the condensing water loop system, is generally the name given to all deposits found in the system. In fact, scale is defined as a deposit of a crystallization of a dissolved salt when its concentration exceeds its solubility. A true scale will re-dissolve without chemical change if the water composition is so altered that the water becomes unsaturated with respect to the precipitated compound. Condensing water loops will have scales of calcium carbonate, and calcium sulfate where sulfuric acid has been used for scale control. Calcium phosphate is often found in systems using sewage treatment effluent for makeup. Magnesium hydroxide is found in systems where magnesium is used as a corrosion inhibitor, and magnesium sulphate where sulphuric acid has been used for scale control. Barium sulphate is also found in systems where barium is used as a corrosion inhibitor and sulphuric acid is used for scale control. Sodium chloride deposits are often found in systems where chlorine has been used as an oxidizer for biofilm control. Where silica and silicates are in the water, they will combine with the other scale forming salts to create a very hard and particularly insoluble scale. The most common form of silica scale is calcium silicate which is a superior insulating material that can drastically reduce condenser thermal efficiency as well as restrict the flow through the heat exchanger.

Corrosion is an electrochemical process that takes place to some extent whenever a metal, water, and depolarizing agent are brought together. Any condition that causes one point on a metal surface to differ from another will permit corrosion to occur. The galvanic action of two different metals joined together in the presence of water will initiate corrosion on the more anodic of the two. Because corrosion is chemical, its rate increases with heat, therefore being the greatest in the condenser and on the condenser discharge side of the loop. Corrosion, like scale, is controllable and, to a limited extent, reversible with the proper maintenance of water chemistry balance.

Corrosion and scale are associated problems but the effect and cause should not be confused. The essential effect of corrosion is to destroy metal; scale, on the other hand, tends to clog open sections and to line surfaces with deposits. The products of corrosion often contribute to scale formation and aggravate the problem of its treatment.

Description of Fouling on Cooling System Operation:

Any film or deposit which forms on the waterside heat exchange surfaces reduces the heat exchange efficiency of the system (See Table 2). System efficiency is further reduced by maintenance shut downs for removal of deposits, and the repair or replacement of piping, valves, and equipment abraded by the suspended particles in the water or damaged by corrosion.

TABLE 2

| Heat Loss from Condenser Tube Scale (%) | | | |
|---|---|---|---|
| Scale Thickness Inches | Soft Carbonate | Hard Carbonate | Hard Sulphate |
| 1/50" | 3.5 | 5.2 | 3.0 |
| 1/32" | 7.0 | 8.3 | 6.0 |
| 1/25" | 8.0 | 9.9 | 9.0 |
| 1/20" | 10.0 | 11.2 | 11.0 |
| 1/16" | 12.5 | 12.6 | 12.6 |
| 1/12" | 15.0 | 14.3 | 14.3 |
| 1/9" | — | 16.0 | 16.0 |
| 1/8" | — | 25.0 | 25.0 |
| 1/4" | — | 50.0 | 50.0 |

Blowdown of the tower basin and sump has been the primary method of controlling the buildup of the suspended solids concentration in the circulating water. This process is expensive, wasteful of water, and potentially hazardous. The blowdown process requires that thousands of gallons of basin and sump water be dumped periodically and replaced with new make-up. Towers using municipal water supplies must purchase the make-up. The dumped water will also remove additives placed in the system to control biofilm, scale, and corrosion. Since some of these additives are potentially hazardous, the blowdown water must be discharged into approved sewers, with the accompanying costs, and must be monitored and reported, at an additional maintenance cost.

Another method employed to reduce or control the buildup of suspended solids in the condensing loop water is side-stream filtration. In this method, a portion of the circulating water (usually 1% to 10%) is drawn off and run through filters to remove the suspended solids. This method, while effecting the buildup of suspended solids, still requires the introduction of compounds to control biofilm, scale, and corrosion. Therefore, the filter discharge and the sludge will still contain potentially hazardous compounds requiring special discharge methods and controls.

Ozonization is also used in some systems and applications to replace chemical or organic biocides. Ozone, while an effective biocide, cannot by itself address all forms of organic matter which may foul the cooling water system. Ozonization will not eliminate the need for chemicals to control scale or corrosion. Unless used with side-stream filtration, blowdown will still be required to control the buildup of suspended solids. Potentially toxic compounds in the blowdown discharge (or filter discharge) and in the sump sludge will still exist with an ozonization system.

Magnetics, electrostatic charges and ultrasonic waves have also been used in some systems in a non-chemical attempt to control scale and corrosion. All of these methods still require the use of chemical or organic compounds for biofilm control, with the resulting potentially toxic blowdown and sump sludge discharge problems noted above. Also, unless coupled with side-stream filtration, none of these methods fully address the buildup of suspended solids.

As already noted, the introduction of chemical or organic oxidizers have been used as a method of controlling biofilm, but the oxidizers accelerate corrosion. Chemical oxidizers form potentially toxic compounds, while organic oxidizers do not form potentially toxic by-products.

To control scale and corrosion, some systems use chemical inhibitors. These chemicals are introduced into the circulating water to form insoluble oxides to coat the metallic surfaces to inhibit corrosion and provide a surface that is less likely to attract and hold scale forming compounds. These chemicals do not inhibit scale formation on the non-metallic surfaces of the cooling tower. The by-products of the scale inhibiting chemicals are potentially toxic, requiring expense for the discharge and control of the by-products. The chemical reaction with the circulating water results in new compounds being formed which add to the suspended solids burden of the water. The insoluble oxides formed to inhibit scale and corrosion, when deposited on the walls on the waterside condensing tubes, form an insulating layer, reducing the thermal efficiency of the condenser.

Another method of attempting to control scale and corrosion is the use of self-sacrificing magnesium anodes to coat the metallic surfaces with magnesium hydroxide to inhibit corrosion. Similar to the effects of the inhibiting chemicals noted above, magnesium hydroxide only inhibits corrosion of the metallic surfaces and it has no effect on the corrosive and leaching properties of the circulating water on the non-metallic surfaces of the tower and basin. Also similar to the chemical inhibitors, the magnesium hydroxide coating on the waterside of the condenser tubes is a thermal insulator decreasing the thermal efficiency of the condenser.

All existing methods of controlling fouling require (I) blow down, (ii) sanitary sewer or environmentally acceptable methods of discharging blowdown water or backwash water from side-stream filtration, (iii) expensive and time consuming additions of additives to control biofilm, scale, and corrosion, (iv) special procedures for the removal and disposal of sump sludge when potentially toxic compounds are precipitated as by-products of the chemical treatment to control biofilm, scale, or corrosion, and (v) the loss of thermal efficiency at both the waterside of the condenser and within the tower due to scale buildup. Even with inhibitors, periodic brushing of the condenser tubes and the tower surfaces is necessary to remove scale. When the method employed for the control of buildup of suspended solids is periodic blowdown, then the recurring buildup will abrade the surfaces of the condensing loop piping, valves, pumps, and condensers decreasing their design life and increasing maintenance costs.

U.S. application, Ser. No. 08/340,743 to Snee entitled "Electrical Water Purification Devises and Methods", which is herein incorporated by reference, discloses a water purification system including (in one exemplary embodiment) a pair of electrodes, at least one of which comprises a plasma fused iridium coated titanium electrode used for the purpose of creating oxygen, hydrogen, and hydroxyl ions in the treatment of water; and according to another aspect of the invention, embodies a pair of copper electrodes to provide copper ions for the control of algae and bacteria. This Snee invention further provides a filtration and method of using these electrodes.

U.S. Pat. No. 5,007,994 to Snee, entitled "Water Purification System", which is herein incorporated by reference, discloses a water purification system using a pair of carbon electrodes and a pair of copper electrodes submersed in the water to be filtered. When a potential is applied across these electrode pairs, the copper electrodes release copper ions, while the carbon cathode produces hydrogen ions and the carbon cathode produces oxygen ions. These ions produce a beneficial water treatment effect. Carbon electrodes are, however, subject to wear and have a limited life. The present invention provides an improved water treatment system and method.

As a related task of water treatment systems, Applicant has been testing its electronic oxidation and ionization apparatus in connection with pullet, layer and production facilities and has discovered major unexpected advantages to its method of treating water in connection with the health of the poultry. These advantages include decreased mortality, increased weight gain of pullets, lower feed conversion, better vaccine results, greater egg production, lower labor costs, lower maintenance, and easier operation of the processing plant.

As is well known in the art, poultry drinking water is provided by $H_2O$ lines connected to drinker cups and/or nipples. The drinker cups have a white ball attached to a nipple, which fill the drinker cup with water. Drinker nipples are held in place by water pressure in the $H_2O$ lines, so that they are normally closed. The bird pushes on the nipple to open the nipple to allow water to drip out. Scale formation has been a major problem in the past in connection with drinker cups and $H_2O$ lines. The valve mechanism includes a seat and ball, and scale forms between the seat and the ball, which prevents the nipple from closing, so that the drinking cup leaks. Leaking drinking cups cause several problems. First, the poultry are stacked in cages, so that if a drinking cup at the top of the stack is leaking, poultry below will get wet. Secondly, the manure on the ground will get wet, which is undesirable since this produces ammonia, which is hazardous to the poultry and maintenance personal. Also, the poultry does not consume the water fast enough and the remaining water becomes stagnant with a bad odor or leaks and drips on the poultry litter. The water in the drinker cups can also become contaminated with feces and bacterial growth. Chlorine cannot be used to clean the drinker cups because the poultry does not like the smell. The poultry will back off drinking water from the drinking cups and drink poor quality water elsewhere, which can make them sick, and causes them to eat less. The poultry gut flora gets destroyed so that the poultry cannot absorb nutrients correctly. The poultry can get secondary infections and suffer from dehydration. All of these health problems result in poorer quality poultry, and poultry with higher mortality rates.

The present invention provides a more efficient, economical and improved apparatus and method for the control of scale, corrosion and biofilm in a water system using electronic oxidation and ionization with side-stream filtration. The present invention also provides a method for treating poultry drinking water which solves the problems discussed above.

All U.S. patents and applications and all other published documents mentioned anywhere in this application are incorporated herein by reference in their entirety.

Without limiting the scope of the invention a brief summary of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

The invention is generally a water treatment system. According to the an embodiment of the invention, there is provided a condensing water loop side-stream (or by-pass) filtration and treatment system in a self contained skid-mounted apparatus. Condensing water is drawn off the discharge side of the pump and prior to the condenser, routed through the side-stream (or by-pass) filtration and treatment apparatus and returned to the condensing loop down stream of the condenser and prior to the cooling tower. According to an alternative embodiment of the invention, condensing water is drawn from the cooling tower basin and routed through the apparatus and returned to the cooling tower spray deck. The water is drawn out of the condensing loop (or in the alternative, out of the basin) and through the apparatus by use of a pump mounted on the apparatus. The drawn water is pumped through an automatic backwashing, multimedia filter, which is also mounted on the apparatus. The use of the filter may not be required if blowdown (or purge) is not an economic concern to the cooling tower operator. Following the filter (if used), the drawn water is pumped through two separate electrode chambers, the first of which includes a pair of electrodes at least one of which comprises a plasma fused iridium coated titanium electrode or, preferably, a titanium electrode which has been coated with ruthenium used for the purpose of creating nascent oxygen, molecular oxygen, ozone, hydroxyl and perhydroxyl radicals, and hydrogen peroxide in the treatment of the water. The ruthenium coated electrodes are coated by Eltech Systems Corp of Chardon Ohio using a commercially available process. These electrodes also create a flux field which aligns the polarity of the dissolved and suspended metallic salt compounds as part of the method of controlling scale. According to one alternative embodiment of the invention, a commercially available self-contained unit for the production of ozone may be substituted in lieu of, and instead of, the electrode chamber containing plasma fused iridium coated titanium electrodes. The second electrode chamber contains a pair of electrodes formed of copper which provides copper ions for the control of biofilm (algae, bacteria and fungus) in the condensing water loop and on the cooling tower surfaces. This second set of electrodes also creates a flux field similar to the first set of electrodes. After the second electrode chamber, the filtered and treated water is returned to the condensing loop for discharge over the cooling tower surfaces and circulation through the condensing water loop. According to one alternative embodiment of the invention, the condensing water may be returned to the condensing loop without going through the second electrode chamber containing a pair of copper electrodes. In this alternative, make-up water would be routed through the second electrode chamber containing a pair of copper electrodes and returned to the cooling tower basin.

It is a purpose of the present apparatus and method to prevent scaling, biofilm and corrosion within a condensing loop without the use of chemicals.

The inventive method also assures the retention of calcium in drinking water provided to an animal by suppling water to a water feed line which is connected to a drinking device, oxidizing the water to retain calcium in the water in solution, ionizing the water using copper electrodes, the ionization sanitizing the water and providing residual copper ions which act as an algicide and a biocide, and providing the ionized oxidized drinking water which retains calcium in solution to the animal for drinking.

The inventive method may also improve the drinking water by precipitating metals out of the water after oxidation, and filtering out the precipitated metals from the water prior to ionization.

The oxidized and ionized water dissolves calcium into solution from scale deposits.

Although the inventive method is disclosed for use with poultry, which drink from a poultry drinking device, it could be utilized to treat drinking water for any animal.

When the poultry ingest the water retaining calcium in solution, harder egg shells were obtained. Currently, calcium supplements are fed to poultry with their feed, but it has been found that the amount of calcium absorbed into the body is much less from a solid compound as compared to taking the calcium into the body in liquid form.

BRIEF DESCRIPTION OF THE DRAWINGS

In the drawings, wherein like reference numerals represent like parts throughout the several views.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

Figure 1:
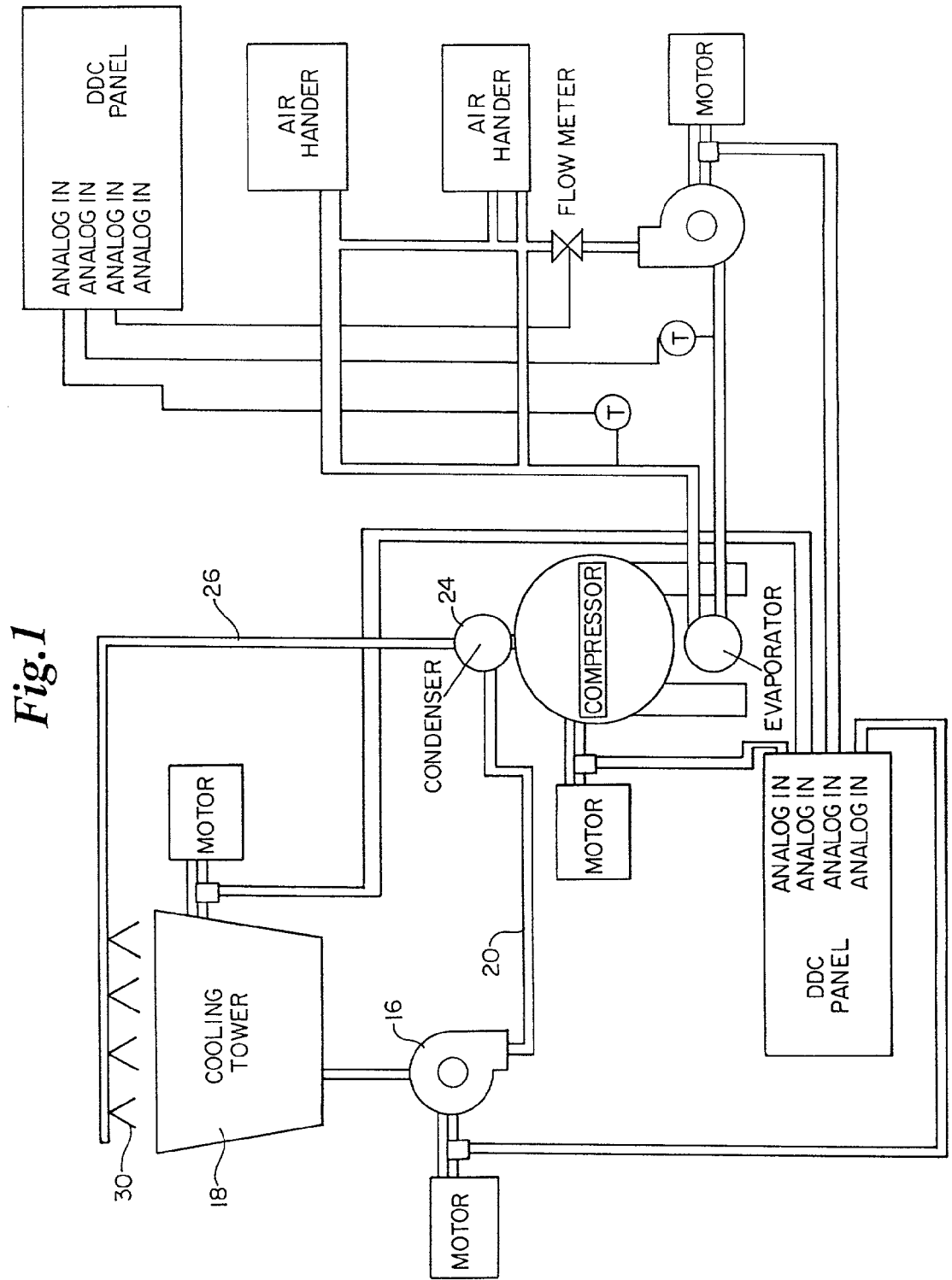
FIG. 1 shows a general schematic illustration of a conventional condensing water loop used as coolant or mass heat transfer system.

With reference to the drawings, FIG. 1 illustrates a general schematic illustration of a conventional condensing water loop (HVAC) mechanical system with the condenser water loop used as coolant or mass heat transfer system. In the HVAC system, as the cooled water is pumped from the cooling tower 18 through piping, it travels through pump 16, which controlled by a motor. After the water is forced through the pump 16 and into piping 20 the water is diverted through piping 20 and passes through the condenser 24, absorbing the generated heat, and up through piping 26. The condenser work in coordination with the compressor and the evaporator to remove excess heat. The heated water escapes through piping 26 and is sprayed onto the cooling tower 18 through spray nozzles 30, thus cooling the water to be used again.

Figure 2:
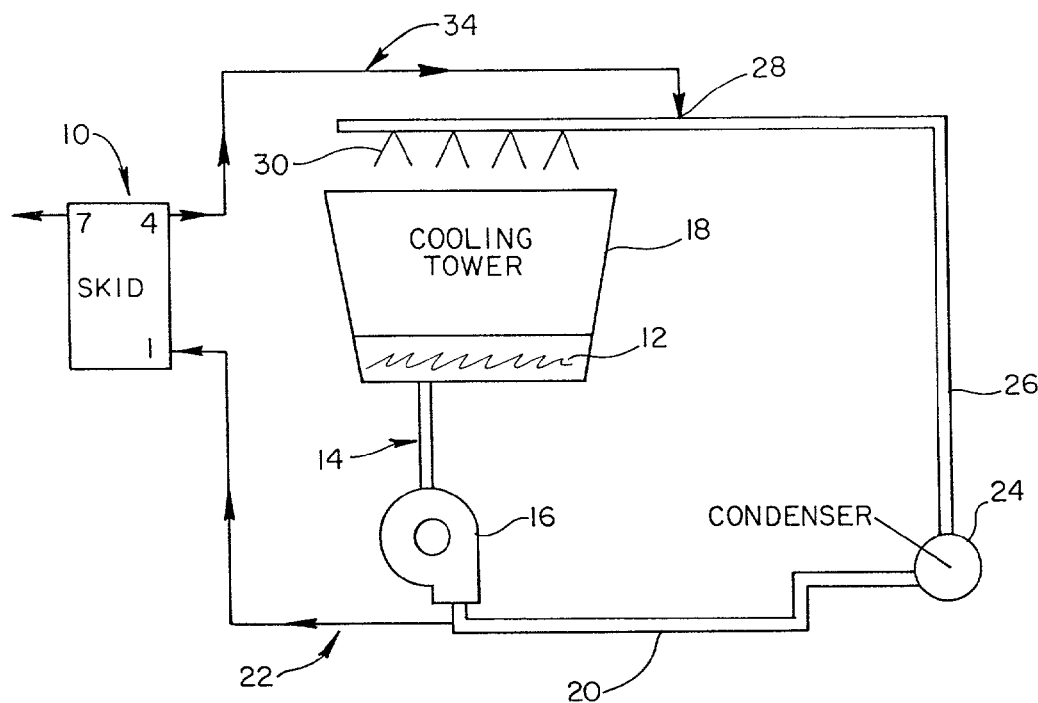
FIG. 2 shows a schematic illustration of an alternative embodiment of the condensing loop of the present invention.
Figure 3:
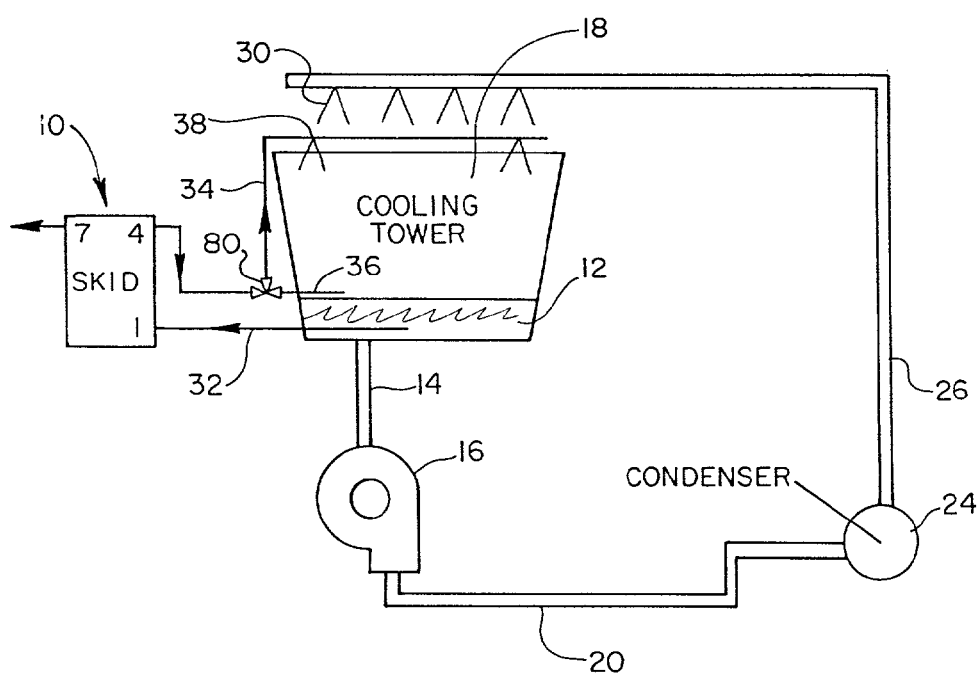
FIG. 3 shows a schematic illustration of an alternative embodiment of the condensing loop of the present invention.
Figure 4:
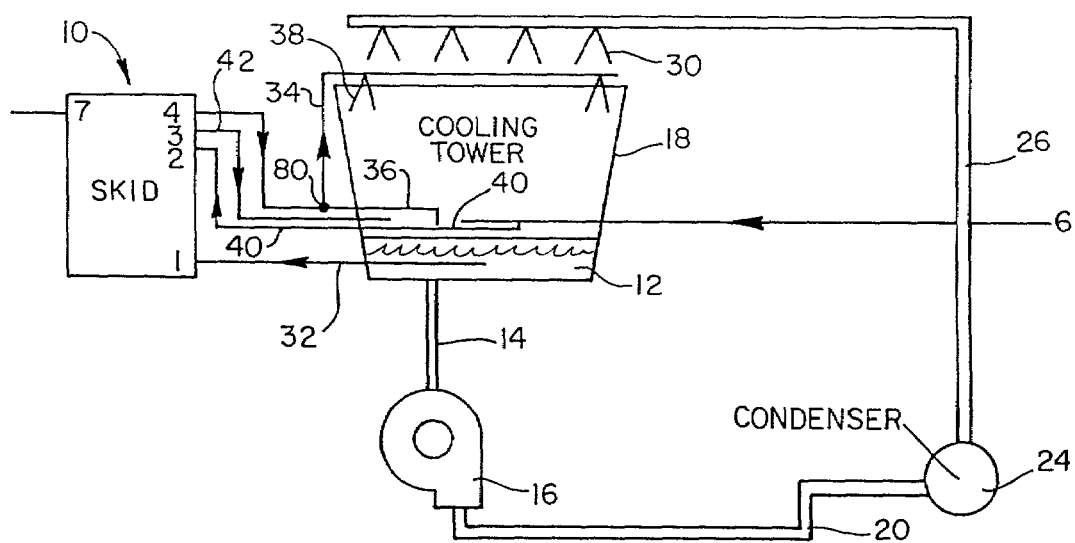
FIG. 4 shows a schematic illustration of the makeup loop embodiment of the condensing loop of the present invention.

In FIGS. 2–4 there is provided schematic illustrations of the condensing water loop of the present invention showing the positioning of the side-stream (or by-pass) filtration and treatment system in a self contained skid-mounted apparatus. The water treatment apparatus (WTA) of the present invention is generally indicated by reference numeral 10.

FIGS. 2–4 provide illustrations of the pathways of the various embodiments of the invention. In the embodiment of FIG. 2, as the cooled water is pumped from the basin 12 of the cooling tower 18 through piping 14, it travels through pump 16. After the water is forced through the pump 16 and into piping 20, a portion of the water is diverted through smaller piping 22. The water diverted through piping 20 passes through the condenser 24, absorbing the generated heat, and up through piping 26. The water which was diverted after the pump 16 travels up through the WTA 10 at inlet 1. Waste water exits the WTA 10 at waste exit 7 and the treated water exits the WTA 10 at exit outlet 4. The treated water reenters the water loop at point 28 into piping 26. The combined water is sprayed onto the cooling tower 18 through spray nozzles 30, thus cooling the water, dissolving the scale on the cooling tower surfaces 35, and oxidizing biofilm on the surfaces 35 and in the basin 12.

FIG. 3 illustrates a further pathway embodiment. In this case, a portion of the water is drawn from the basin 12 through piping 32 and into the WTA 10 at inlet 1. As the treated water exits the WTA 10 via 4, it is reintroduced into the water loop by piping it into the cooling tower through piping 36, or it is reintroduced into the top of the cooling tower through piping 34 via 3-way valves. In the latter case, the treated water is sprayed down the sides of the cooling tower via dispersion sprayers, or tower top misters 38.

FIG. 4 illustrates a further pathway embodiment. In this case, similar to FIG. 3, a portion of the water is drawn from the basin 12 through piping 32 and into the WTA 10 at inlet 1. As the treated water exits the WTA 10, it is reintroduced into the water loop by piping it into the cooling tower through piping 36, or it is reintroduced into the top of the cooling tower through piping 34 as in FIG. 3. In this embodiment, a portion of the make-up water which is introduced into the cooling tower 18 through piping 6 is diverted through smaller piping 40 into the WTA 10 at the makeup water intake 2. After the makeup water is treated through the Cu side loop application, which is further explained below, it exits at the makeup water discharge 3 and is introduced into the cooling tower 18 through piping 42.

Figure 5A:
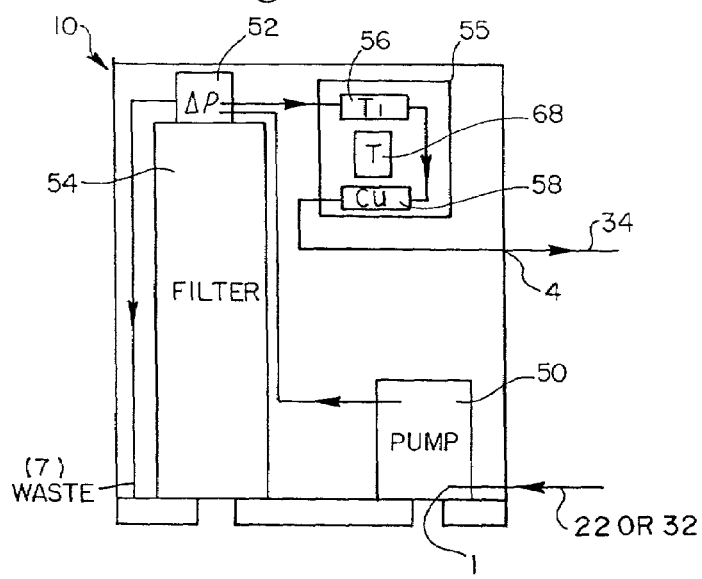
FIGS. 5(a–c) show a schematic illustration of the water treatment apparatus of the alternative embodiments of the condensing loop shown in FIGS. 2–3.
Figure 5B:
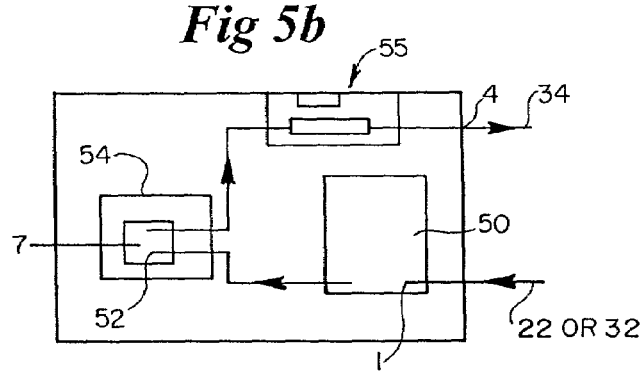
Figure 5C:
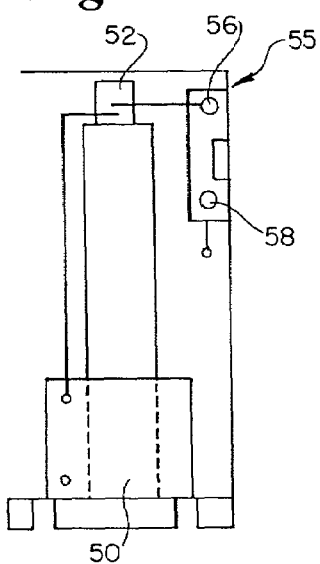

FIGS. 5a–c show a more detail illustration of the WTA in FIGS. 2–3. FIG. 5a shows a side view of the WTA. As the water is diverted from the loop it enters the WTA at the intake 1 and flows through pump 50, which pumps the water up into a pressure differential valve (PDV) 52, or control box, which diverts the untreated water down through an optional multimedia sediment filter tank 54. The filter is preferably a Multimedia depth filter. Any fiberglass automatic filter may be used, depending on the flow rate. Such filters are well known and can be procured from Alamo Water Refiners, Inc. (N5240-13). As the filtered water exits the filter 54 the PDV 52 diverts the waste water out through exit 7 and the treated water is diverted through an electrode treatment zone 55, which houses two separate electrode chambers 55, the first of which includes a pair of electrodes 56 at least one of which comprises a plasma fused iridium coated titanium electrode or, preferably, a titanium electrode which has been coated with ruthenium. The second electrode chamber contains a pair of electrodes 58 formed of copper. After the second electrode chamber 58, the filtered and treated water is returned to the condensing loop via outlet 4 for discharge over the cooling tower surfaces and circulation through the condensing water loop. FIGS. 5b and 5c show top and end views, respectively.

Figure 6A:
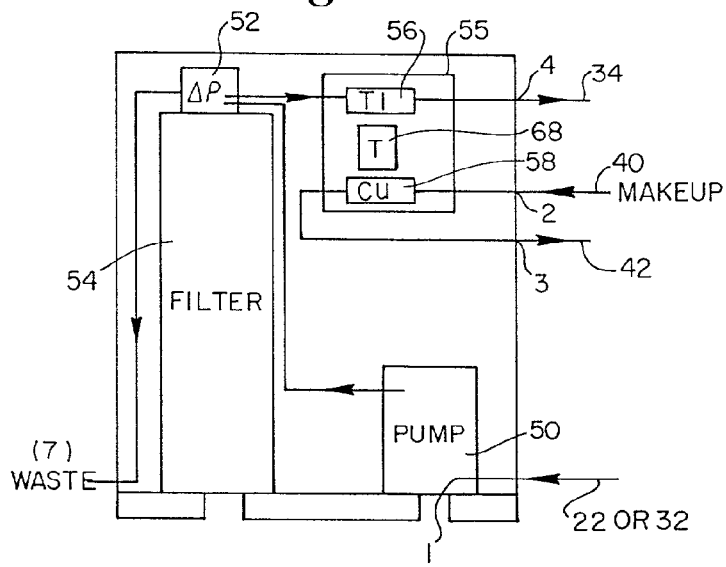
FIGS. 6(a–c) show a schematic illustration of the water treatment apparatus of the alternative embodiment of the condensing loop shown in FIG. 4.
Figure 6B:
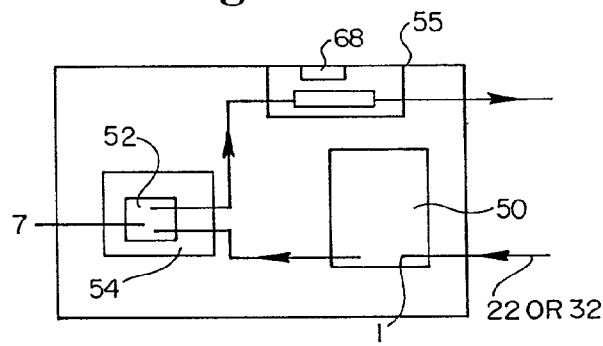
Figure 6C:
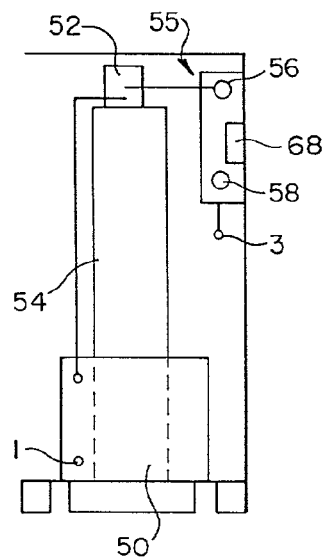

FIGS. 6a–c show a more detailed illustration of the WTA in FIG. 4. FIG. 6a shows a side view of the WTA. According to this alternative embodiment of the invention, the condensing water is returned to the condensing loop without going through the second electrode chamber 58 containing a pair of copper electrodes. In this alternative, make-up water 2 would be routed through the second electrode chamber 58 containing the pair of copper electrodes and returned to the cooling tower basin via 3. FIGS. 6b and 6c show top and end views, respectively.

Figure 7A:
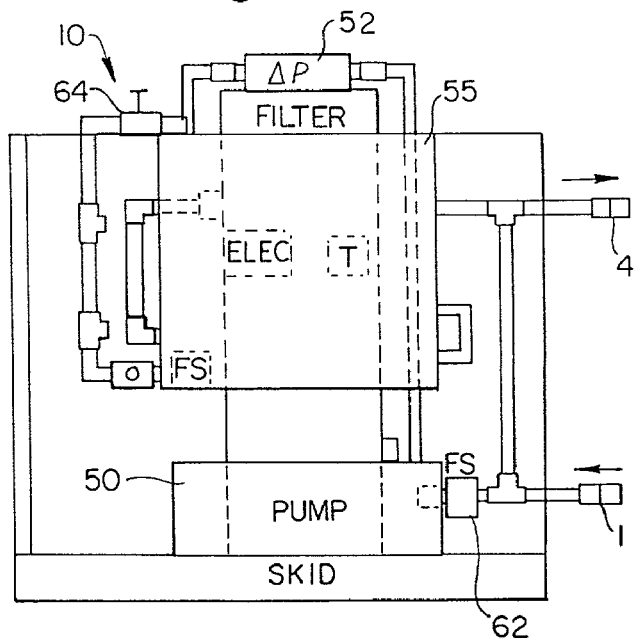
FIGS. 7(a–c) show a further detailed schematic illustration of the water treatment apparatus of the alternative embodiments of the condensing loop shown in FIGS. 2–3.
Figure 7B:
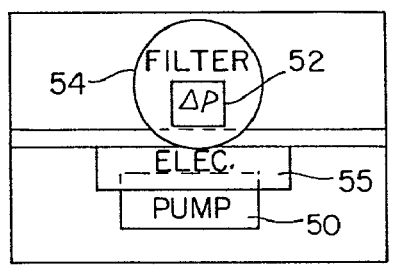
Figure 7C:
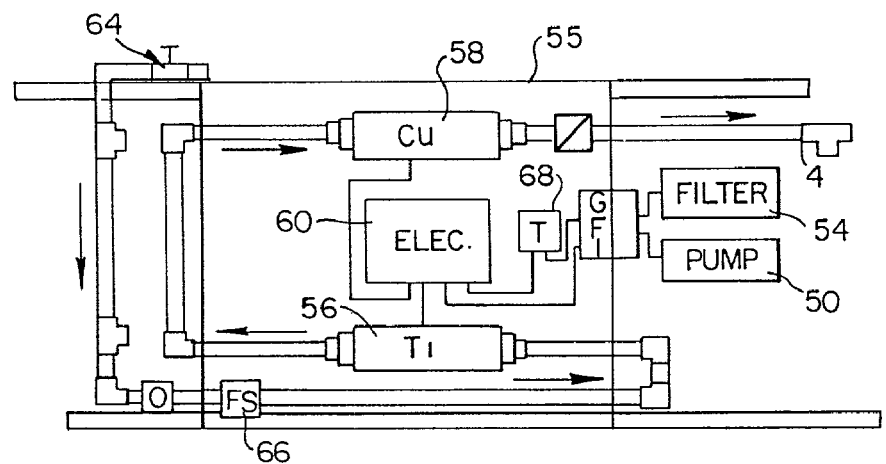

FIGS. 7a–c show a preferred configuration of the components of the WTA in FIGS. 2–3. FIGS. 7a & 7b show the preferred configuration of the skid, including the plumbing, filter, electronics and pump. FIG. 7c shows an internal side view of the electrode chamber, the electronics and the pathway of the water to be treated. As the water is diverted from the loop it enters the WTA at the pump 50 intake 1 and flows through pump 50, via a flowswitch 62, which pumps the water up into a pressure differential valve (PDV) 52, or control box, which diverts the untreated water down through an optional multimedia sediment filter tank 54. As the filtered water exits the filter 54 the PDV 52 diverts the waste water out through an exit (not shown) and the treated water is diverted through ball valve 64 and flowswitch 66 through two separate electrode chambers 55, the first of which includes a pair of electrodes 56 at least one of which comprises a plasma fused iridium coated titanium electrode or, preferably, a titanium electrode which has been coated with ruthenium. The second electrode chamber contains a pair of electrodes 58 formed of copper. The electrode chambers are controlled by electronics 60 and a timer 68, further discussed below, which also controls the filter 54 and the pump 50. After the second electrode chamber, the filtered and treated water is returned to the condensing loop via outlet 4 for discharge over the cooling tower surfaces and circulation through the condensing water loop. The piping is preferably one inch PVC piping.

Figure 8:
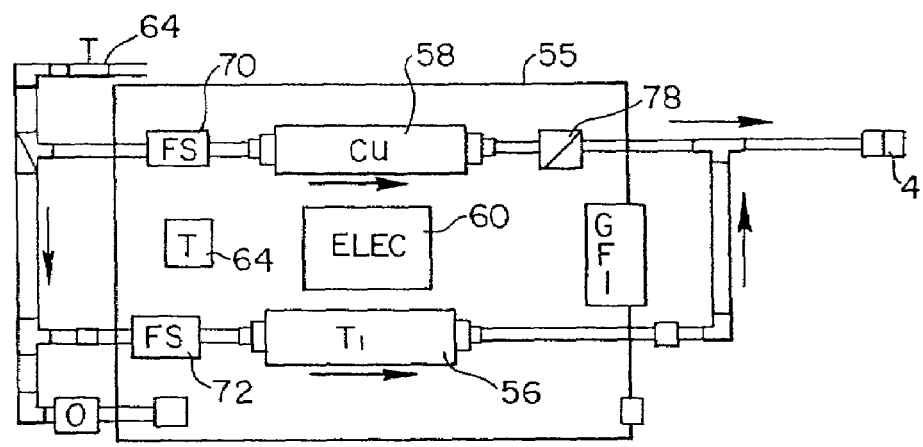
FIG. 8 shows a schematic illustration of an alternative embodiment of the water treatment apparatus of the embodiments show in FIGS. 2–3.

FIG. 8 illustrates an alternative embodiment of the configuration of the electrode chambers for the embodiment shown in FIGS. 2 and 3. Similar to FIG. 7c, the filtered water flows through ball valve 64, but is diverted either to chamber 58 or 56 via a 3-way solenoid valve. The diverted water flows through a flowswitch (70 or 72) and through the chosen electrode chamber and out through outlet 4. As above, the routing of the water is controlled by electronics 60 and timer 68.

Figure 9:
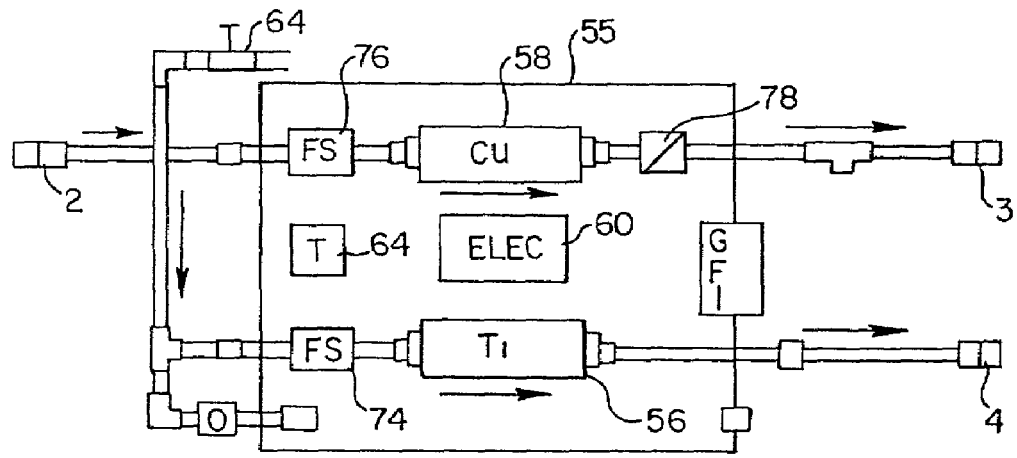
FIG. 9 shows a schematic illustration of an alternative embodiment of the water treatment apparatus of the embodiment show in FIG. 4.

FIG. 9 illustrates an alternative embodiment of the configuration of the electrode chambers for the embodiment shown in FIG. 4. Similar to FIG. 7c, the filtered water flows through ball valve 64, but is diverted through flowswitch 74 only into chamber 56 and out into the basin of the cooling tower via outlet 3. The make-up water which is diverted through inlet 2 flows through flowswitch 76, chamber 58 and check valve 78 and out outlet 3. As above, the routing of the water is controlled by electronics 60 and timer 68.

Figure 10:
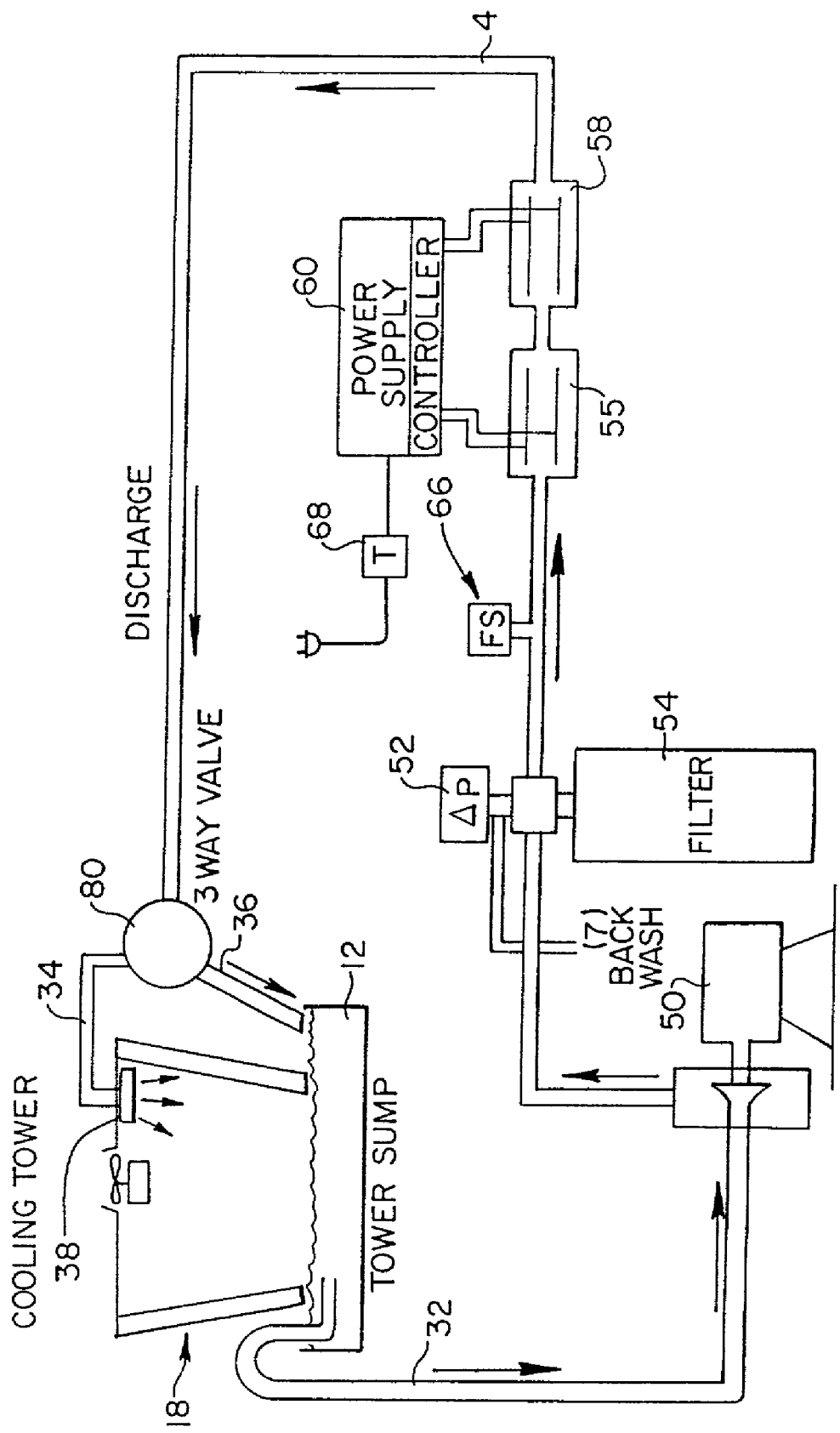
FIG. 10 shows a further diagram of the embodiment shown in FIG. 3.

FIG. 10 further illustrates the treatment system of the embodiment shown in FIG. 4, minus the cooling loop. The Figure shows a cooling tower ionization treatment piping diagram. As described above, the water to be treated is pumped (50) from the basin 12 via piping 32 into the pressure differential valve (PDV) 52, or control box, which diverts the untreated water down through an optional multimedia sediment filter tank 54. As the filtered water exits the filter 54 the PDV 52 diverts the waste water out through exit 7 and the treated water is diverted through flowswitch 66 and through electrode chambers 56 and 58. The chambers are controlled via the power supply controller (electronics) 60 which is actuated by the timer 68. After the second electrode chamber 58, the filtered and treated water is returned to the condensing loop via outlet 4 for discharge into the cooling tower 18. The treated water flows into a 3-way valve 80. The water is diverted either into the cooling tower through piping 36 into the basin 12, or it is reintroduced into the top of the cooling tower through piping 34. In the latter case, the treated water is sprayed down the sides of the cooling tower via dispersion sprayers, or tower top misters, 38.

Figure 11:
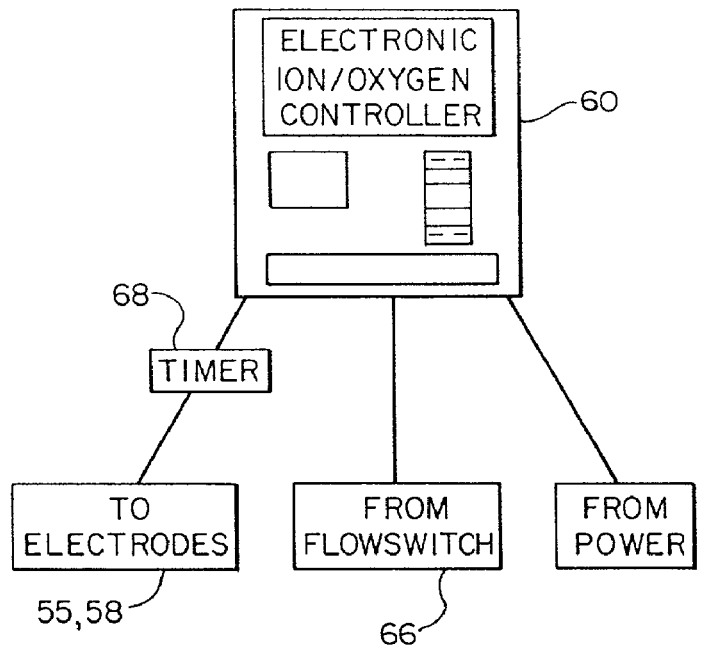
FIG. 11 shows a schematic illustration of the electronic system which controls the water treatment apparatus.

FIG. 11 shows a general schematic of the electronic flow pattern which is controlled by the power supply controller (electronics) 60 that sends direct current to the electrodes 56 and 58 on an alternating polarity and as described in the Snee patents.

Figure 12A:
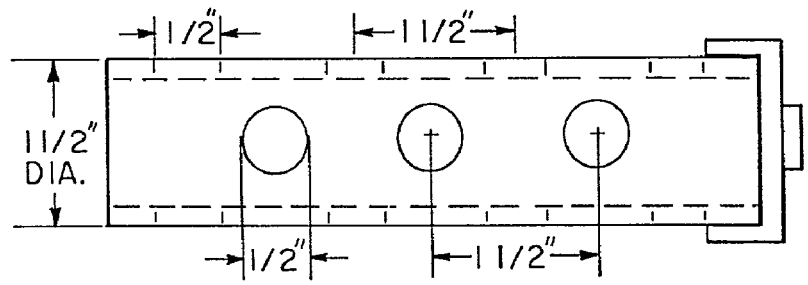
FIGS. 12(a–b) show side view and end view cross-sections, respectively, of the basin water pick up pipe of the present inventive apparatus.
Figure 12B:
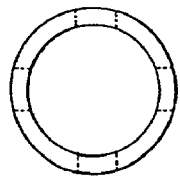

FIGS. 12a and 12b show a preferred 3 inch segment of the sump collection pipe. The pipe is preferably PVC piping and is 1½ inches in diameter with ½ inch holes. This portion of the piping is positioned in the basin of the cooling tower and functions to draw water into the water treatment apparatus. The dots depict the surface of the inside diameter of the pipe and the penetrations of the holes through the pipe walls.

Figure 13:
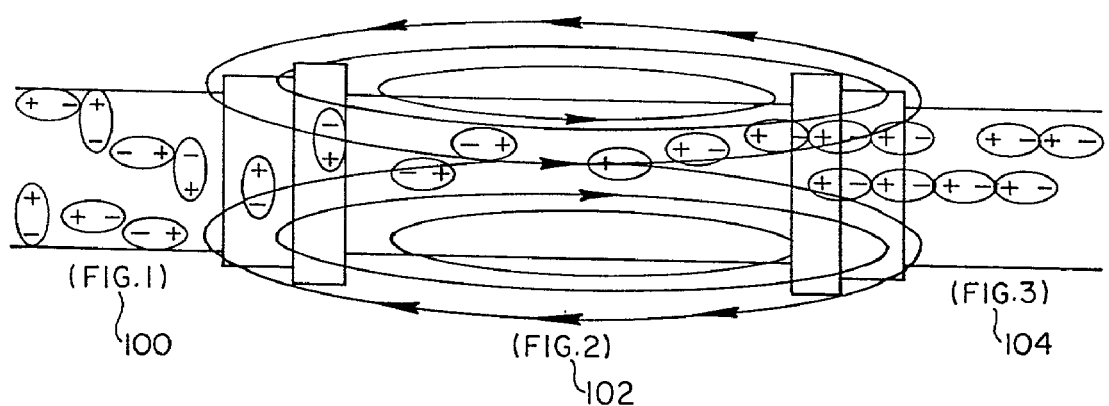
FIG. 13 shows an illustration of the oxidation chamber showing flux field and effect on metallic compounds.

Description of the Electrochemical Aspects of the Invention:

The preferred embodiment of the present invention, as more particularly described in FIG. 13, utilizes well known and accepted electrochemical reactions in combination with side-stream filtration and the oxidation process of U.S. application, Ser. No. 08/340,743 to Snee for a totally non-chemical method of controlling biofilm, scale, and corrosion, and the control of suspended solids buildup. The principles applicable to the process embodied in this invention have not previously been coupled together in the sequences and in combination with other methods to form a single apparatus as is exemplified by this invention.

The electrode chamber 58 containing two copper electrodes is, in accordance with the Snee application, connected to an electronic control unit 60 which provides a low voltage direct current charge to the electrodes with the polarity of such electrodes alternating regularly on a preset cycle. In this invention, there is a timer 68 which may be set and adjusted so that the electrode chamber containing the copper electrodes 58 is only activated as needed in order to maintain a residual of copper electrons in the basin 12 water. As described in Snee, when the electrical charge is applied to the copper electrodes, one electrode is an anode and the other electrode is a cathode. The low voltage electromagnetic force imparted to the circulating waters disassociates some of the hydrogen and oxygen molecules forming the water to create dissolved hydrogen gas, oxygen gas, and free hydrogen ions. Additionally, at the face of the electrodes, positively charged copper ions are discharged into the stream. Preferably ionization of the Cu is maintained at 0.3–0.5 ppm. These are ionic copper charges and not molecular copper particles. The flux field created by the electrical charge to the electrodes polarizes the potential scale forming salt compounds in the circulating water (FIG. 13). Molecules under normal conditions move at random, bonding to one another and clinging to surfaces 100. Upon entering the path of the flux field, the force is concentrated within the chamber, creating the proper energy required to polarize the molecules 102. After being treated, the internal forces orient the positive and negative poles, producing a molecular chain and resulting in flocculation of the solids 104, which forces the minerals to pass through the plumbing system. Existing scale will slowly flake off as the molecular chains loosen the bond and pull the minerals into the flow. Additionally, the flux field causes neutral particles, such as silica and alumina, to take on a negative charge as they pass between the electrodes, thereby enabling such charged particles to repel each other inhibiting their ability to form chains of insoluble scale. The copper ions are primarily used as a biocide and algicide, but additionally are used to replace the calcium in scale already formed within the system. The copper ions will combine with chlorine in the system to form copper chloride, an insoluble salt that will inhibit any further calcified scale from forming. The dissolved hydrogen and hydrogen ions will combine with sulfides in the water to form insoluble particles. When the electrode chamber containing the copper electrodes is activated by the timer, the other electrode chamber containing the plasma fused iridium coated titanium electrodes or, preferably, the titanium electrodes which have been coated with ruthenium 56 is not receiving an electrical charge. The ionized water is returned to the condensing loop where it is dispersed over the tower 18 surfaces acting as an effective biocide and re-dissolving and re-mineralizing scale deposits on the tower surfaces. As the ionized water is drawn from the system, the insoluble calcium chloride, sulfide compounds and other suspended solids are trapped in the multimedia filter 54 and periodically back washed. Ionized particles and dissolved gases will pass through the filter and into the condensing water loop where the copper ions will replace calcium in any scale deposits in the condenser or condensing loop piping, valves or equipment and over time, re-dissolving and re-mineralizing such deposits. The copper ions remain in solution and act as a residual sanitizer throughout the condensing loop water system. The polarized scale forming salts and the negatively charged silica and alumina particles will be entrapped by the filter and discharged with the filter backwash. When the timer cuts off the power to the copper electrodes the electrolysis of the copper electrodes will cease.

In an embodiment of this invention, the electrode chamber 56 containing the two plasma fused iridium coated titanium electrodes or, preferably, the two titanium electrodes which have been coated with ruthenium will operate at all times when the copper electrode chamber is not in operation. Similar to the copper electrodes, the electronics controller 60 provides a low voltage direct current to the electrodes with a regularly recurring alternation of polarities. As described in the Snee patent, these iridium coated titanium electrodes are inert and only provide an electromotive force for the disassociation of ions in the water passing between the two charged electrodes. The forces disassociate the oxygen and hydrogen from the water creating nascent (or atomic) oxygen, molecular (or atmospheric) oxygen, heavy oxygen (or ozone), hydroxyl and perhydroxyl radicals and hydrogen peroxide. Each of these are powerful oxidizers (see Table 3) with varying lives and stabilities. The primary purpose of the oxidizers is to "burn up" or oxidize all organic matter within the cooling water. Because the oxidation-reduction potential of the ionized form of these oxidizers is much greater than chlorine or bromine or the molecular forms of organic oxidizers (see Table 3), the result is a more efficient and effective oxidation of biofilm.

TABLE 3

Oxidation-reduction Potential of Water Treatment Oxidizers

| CHEMICAL | SYMBOL | ORP RELATIVE VALUE |
| --- | --- | --- |
| Fluorine | F | 3.03 |
| Hydroxyl Radical | [OH] | 2.76 |
| Atomic Oxygen | O | 2.40 |
| Ozone | $O_3$ | 2.07 |
| Hydrogen Peroxide | $H_2O_2$ | 1.75 |
| Permanganate | $MnO_4$ | 1.67 |
| Hypobromous Acid | HOBr | 1.59 |
| Chlorine dioxide | $ClO_2$ | 1.50 |
| Hypochlorous Acid | HOCl | 1.49 |
| Hypoiodous Acid | HOI | 1.45 |
| Chlorine (Gas) | $Cl_2$ | 1.36 |
| Oxygen | $O_2$ | 1.27 |
| Bromine | Br | 1.09 |
| Iodine | $I_2$ | .54 |

The primary oxidizers used for water treatment are listed above. The oxidation-reduction potential ("ORP") indicates the power to oxidize. The foregoing is a list of oxidizers in the order of strength.

Additionally, the hydrogen peroxide dissolves rust and the oxide scale of the base metals that results from corrosion thereby returning the surface of the metal to a uniform molecular state. In addition to the oxidizers, the electromagnetic force between the iridium or, preferably, ruthenium coated titanium electrodes causes the disassociation of some of the hydrogen and oxygen molecules forming the water, and creates positively charged ions which will combine with negatively charged chemical contaminants. The oxidizers will combine with dissolved minerals and iron which may be found within the condensing water. The molecular oxygen will combine with nitrites and convert them to nitrates. The oxidizers will transform sulphite and hydrogen sulphide to sulphate and colloidal sulphur. The oxidation of dissolved solids will allow the resulting insoluble oxides and hydroxides to settle out of solution so that they can be removed by the side stream-filtration.

The dissolved oxygen and ozone created at the electrodes combines with the transitional metals (copper, nickel, and zinc) found within the cooling water system to form an insoluble oxide of the metal itself inhibiting corrosion. Since the oxide is of the base metal itself, it does not have the insulating properties of the chemical oxides used as corrosion and scale inhibitors.

The titanium electrodes, similar to the copper electrodes, create a flux field which polarizes scale forming mineral salts and imparts a negative charge to the neutral particles of silica and alumina, thereby inhibiting their combination in the formation of scale deposits. The dissolved scale forming chemical compounds discussed above, and dissolved minerals which may be in the water that can cause scale, result in the water being "out of balance" electrically. One of the effects of the flux field is to create chains out of these oppositely charged compounds (See FIG. 13) thereby tending to place the water in a state of electrical equilibrium or "balance." The cathodic plate, of the two iridium or, preferably, titanium coated titanium electrodes, will increase the electron level of the water passing between the plates reducing the bonding of the oxygen atoms of the water molecules and the hydrogen atoms of the adjacent water molecules to create unbonded water molecules which are then more active in their combination with the dissolved chemical compounds and minerals in the water. Water in which the hydrogen bonding has been broken is said to be "conditioned" water. The balance of the water in the condensing water loop is not static because of the continual addition of dissolved chemical compounds and minerals from the addition of make-up to offset the effects of evaporation, combined with the addition of gases and solids scrubbed from the ambient air in the cooling tower. For this reason continuous oxidation of the water is necessary in order to maintain or move towards a balanced and conditioned water within the loop. Side-stream filtration of the precipitated solids resulting from the oxidation process assists in maintaining the water balance.

The ionized oxidizers of activated oxygen are effective biocides and algicides which remove and inhibit the growth of biofilm on the cooling tower surfaces and in the basin. Dead organic organisms are removed from the condensing water loop by the filter embodied in the apparatus. Since the biocides are not chemical, the backwash from the filter can be discharged without requiring the use of sanitary sewer or hazardous chemical monitoring. The ionized particles will pass through the filter and circulate through the system dissolving scale and creating insoluble oxides of transitional metals to inhibit further corrosion.

The most significant effect of this invention is to eliminate all chemicals currently used for the control of fouling and for corrosion inhibitors. Additionally, this invention will reverse and control scale and reverse and control corrosion by the electrochemical action of the ionic particles created in the electrode chambers by mineral ionization of the copper and the activated oxygen ions.

The electromotive force that polarizes the minerals and conditions the water lowers the surface tension of the water making it a more effective and uniform conductor of heat. This property of the conditioned water will have two effects on the condensing loop water. First, on the waterside of the condenser, there will be a more uniform and consistent transfer of heat within the condenser to the water. Second, the reduced surface tension of the water will enable a more uniform and rapid dissipation of the transported heat to the atmosphere in the evaporation process within the cooling tower.

The elimination of scale and of insulating oxides formed by chemicals to inhibit scale and corrosion will increase the thermal efficiency of the system thereby reducing the operating pressures on both the water side and refrigerant/chemical product/steam side of the condenser. Lower operating pressures mean less operating costs (estimated to be up to a 25% savings) for the energy necessary to operate the system at the designed temperature ranges. In the chemical processing application, the increased thermal efficiency will enable a larger volume of saleable products to be produced within the same operating pressures as are currently being maintained with the traditional methods described in this application. In the power generation application, the increased thermal efficiency will enable a larger amount of saleable electricity to be generated within the same operating ranges and costs of the systems as they are currently being maintained.

The elimination of biofilm and scale from the tower surfaces will, with the introduction of ionized water, increase the evaporative effect of the tower. Since towers which have forced or induced drafts require the operation of fans in order to maintain the required temperature drop within the tower, the more effective evaporation resulting from this invention will reduce the need for the fans to maintain such temperature drop, thereby reducing the operating expense of the tower (estimated to be up to a 15% savings) and increasing the operating life of the fan motor and components.

The filter, as described in the Snee application and incorporated into the apparatus, along with its automatic backwashing capabilities, removes the insoluble particles from the condensing water thereby removing those particles which would be susceptible to accumulation as a result of evaporation. The backwash of the filter would only occur as the sedimentation requires, and the volume of water necessary to back wash the filters is significantly less (estimated to be over a 90% savings) then the volume of water required by blowdowns to maintain the same concentration of dissolved solids within the system.

As previously noted above, the lower the volume of blowdown water, the less expense on the system for purchase of makeup water. Also, since no chemicals are involved in the invention, there are no sanitary sewer charges, no hazardous waste disposal costs, no potential pollution from the tower plume and no work place risks associated with the presence of hazardous chemicals.

The reduction of dissolved solids within the circulating waters, the elimination of corrosion accelerating chemicals, and the reduction of fouling deposits will all increase the operating life of the tower, pump, condenser, piping and fan motor (with an estimated life increase of up to five times the untreated life and up to two times the chemically treated life).

Finally, this invention requires less maintenance supervision than any other method, or combination of methods, currently utilized for the control of biofilm, scale and corrosion. It will reduce the periodic maintenance costs for cleaning the tower, basin and sump and should eliminate the need for periodic brushing of the condenser tubes, all at a substantial savings of manpower and labor.

Experimental Analysis:

An evaluation summary of the electronic non-chemical cooling tower water treatment system was conducted to test its effectiveness and efficiency. The system was installed on a cooling tower and condensing water loop. Several issues affect the condensing water loops that pertain directly to the proper operation and maximum efficiency of the HVAC system. The electronic system was evaluated in terms of how well it addressed each of the issues.

Electronic Treatment of the Present Invention:

The electrolytic system tested provides an environmentally friendly, chemical-free treatment for condensing water that controls scale, corrosion and biofilm. This system, when combined with a filter, can control sump sludge. No chemicals means no hazardous materials. With the combined ingredients of "activated" oxygen and ionization, that are generated by the system, soft, sanitary water is provided to protect the equipment, the environment, and the budget.

The Test System:

The test HVAC system has two 286 ton centrifugal chillers connected to a nominal 600 ton updraft cooling tower of wood and fiberglass slat construction. Due to the small A/C loads, only one chiller ran during the test. Prior to the test, scale, corrosion and biofilm were controlled using an in line automated chemical feed system. Sludge build-up and TDS (total dissolved solids) were controlled by periodic blowdowns. The cooling tower slats, deck and sump were physically cleaned annually, and the condenser tubes were brushed annually. Prior to the test commencement the condenser was opened, the tubes were inspected and pictures were taken. Visible scale was observed in the inspection. As part of the test, corrosion coupons were placed in the condensing water system to monitor corrosion. Historical data on electrical usage, water intake, sewer discharge, chemical costs and labor was used in comparison with the observed data of the test. At the commencement of the test the cooling tower, condenser, piping and equipment were operating normally and within the accepted range of a "clean" system.

Observed Results:

Within a few days after the system was installed and turned on, scale on the cooling tower slats began sloughing off in large clumps. At the conclusion of the test period all scale residue had been removed from the slats, deck and other exposed surfaces. When the condenser was opened and inspected, the pre-test scale was gone and no new scale had formed. The coupons indicated no metal corrosion in the system from the use of the test equipment, or the non-use of inhibitors.

The pre-test visible green and brown live biofilm was eliminated, and the black residual line in the sump and on the tower surface was dead algae easily removed by hand wiping or brushing.

Due to the sloughing of the tower scale, the in line cartridge filter installed as part of the test system was unable to handle the load. Several blowdowns were necessary to void the sump of the scale. The in line cartridge filter was removed, and a large in line, automatic backwashing, multimedia filter was installed, after which the test system operated as designed backwashing only every third or fourth day.

The electrical draw on the one operating chiller on the condensing water loop was decreased by 40 amps while maintaining design temperature on the leaving chill water at full load conditions.

Effective Savings:

The test demonstrated immediate and significant savings for this particular test site. Within one week the electrical draw was reduced by 40 amps on the one operating chiller with a resulting savings of an estimate of $579.62 per month. If the building A/C load had required both chillers to operate, then the electrical savings would have been 40 amps on each, for twice the savings as one. The elimination of chemicals saves an estimate of $308.45 per month, plus the time and expense of inventorying, monitoring and disposal. The elimination of scale and biofilm build-up on the tower surfaces and in the condenser will result in annual labor and equipment savings of an estimated $307.20. The totally non-chemical treatment for scale and biofilm, when coupled with the test system's automatic backwashing filter, maintains TDS without blowdown. The water savings is an estimate of $78.11 per month. Because of the absence of any environmentally damaging chemicals, the backwash may be discharged without a sewer charge, with a resulting savings of an estimate of $109.77 per month. Depending on the actual number of months of operation of the HVAC system, the estimated annual savings from this invention's use at the test site is shown on Table 4.

TABLE 4

Estimated Annual Savings Calculation
Annual savings based on a varying season length. Based on 16 hours/day, 7 days/week.

|  | Monthly | 7 mo | 8 mo | 9 mo | 10 mo | 11 mo | 12 mo |
| --- | --- | --- | --- | --- | --- | --- | --- |
| Electrical (with only one chiller in use) | $579.62 | $4,057.34 | $4,636.96 | $5,216.58 | $5,796.20 | $6,375.82 | $ 6,955.44 |
| Chemical | 308.45 | 3,701.40 | 3,701.40 | 3,701.40 | 3,701.40 | 3,701.40 | 3,701.40 |
| Maintenance |  | 307.20 | 307.20 | 307.20 | 307.20 | 307.20 | 307.20 |
| Water | 78.11 | 546.77 | 624.88 | 702.99 | 781.10 | 859.21 | 937.32 |
| Sewage | 109.77 | 768.39 | 878.16 | 987.93 | 1,097.70 | 1,207.47 | 1,317.24 |
| Total Savings Per Year |  | $9,381.10 | $10,148.60 | $10,916.10 | $11,683.60 | $12,451.10 | $13,218.60 |

Note:
Annual savings would increase by $1.29 for each hour that the second chiller was required to operate.

The elimination of scale, biofilm and corrosive chemicals significantly increases the life of the tower slats, condenser tubes, pumps, piping and valves. The exact amount of benefit from such equipment savings has not been calculated, but is expected to be significant.

Reductions in workman compensation, general liability and environmental liability from the removal of hazardous chemicals from the workplace, the tower plume mist, blowdown discharge and sludge should be likewise significant.

The actual pre and post-installation procedures will depend on the quantities of scale build-up on the tower surfaces and sludge present in the sump. Most preferably, the side system should be incorporated into a thoroughly cleaned condensing loop, wherein the scale is completely removed. Ionization of the system water helps dissolve old deposits and corrosion, but all systems should be thoroughly cleaned before installation of the treatment system to remove old scale and corrosion crusts that may be coated by chemical corrosion inhibitors, but never removed. The condensing loop and cooling tower should be throughly cleaned and inspected before installation of the treatment system, because it will cause rapid descaling that may be too much for blowdowns.

Figure 14:
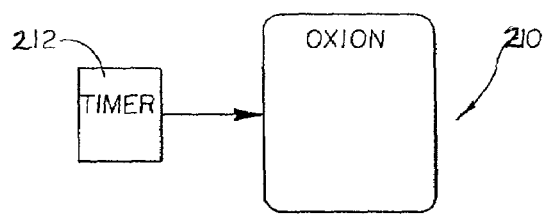
FIG. 14 is a schematic view of the apparatus for performing the inventive method.

Referring now to FIG. 14, the water treatment apparatus is shown generally at 210, and may be controlled with an optional timer 212. In the preferred embodiment, the timer is configured to operate the water treatment apparatus 210 in conjunction with the lighting system of a pullet house.

Figure 15:
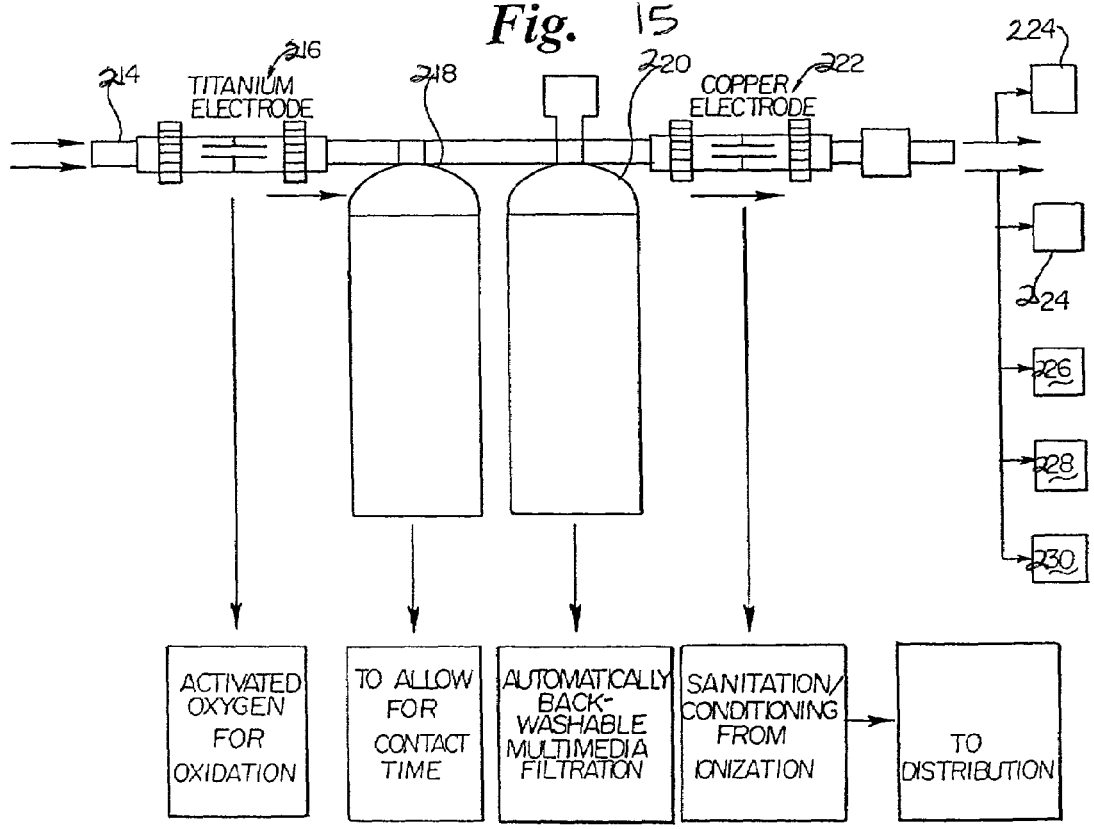
FIG. 15 is a more detailed schematic view of the apparatus for performing the inventive method.

Referring now to FIG. 15, the water feed line is shown at 214, which supplies water, such as well water to a pullet house. The water feed line 214 is connected to the oxidation apparatus 216, which is connected to a holding tank 218, which is connected to a filter tank 220, which is connected to ionization apparatus 222. Ionization apparatus 222 is connected to the distribution line which supplies water to a plurality of pullet drinker cups 224. The treated water is also used in the layer houses 226, the processing plant 228 and the evaporative cooling systems 230 used in connection with pullet and layer houses, as will be discussed further below. The electronic oxidation, filtration and ionization apparatus is of the same general type as described in U.S. Pat. Nos. 5,007,994, 5,603,843, and U.S. application Ser. No. 08/983376.

The oxidation apparatus 216 of the preferred embodiment utilizes a titanium electrode which has been coated with ruthenium, as mentioned above, instead of the iridium alloy coated titanium electrode of Ser. No. 08/983376. The electrodes are coated by Eltech Systems Corp of Chardon Ohio using a commercially available process. The ionization electrodes of apparatus 222 in the preferred embodiment are made of zinc and copper, so that they release zinc and copper ions into the water. In addition to the benefits of copper ions in water as discussed in Ser. No. 08/983376 and U.S. Pat. Nos. 5,007,994 and 5,603,843, which sanitize and act to kill algae, bacteria and fungus, copper has other health benefits for poultry. Currently poultry are feed solid copper supplements which have beneficial health benefits including killing parasites in poultry. However, applicant has discovered that the poultry can better absorb copper in solution compared to copper in solid supplement form. In addition, applicant has learned that zinc in solution also is incorporated into the eggshell, where it acts to kill bacteria.

The treated water is also used for scale control, because the ionized oxidized water prevents scale formation and dissolves existing scale. Scale build-up can shorten the life of pipes due to corrosion and resulting leaks, and in processing plants boilers and lines can cause increased energy consumption to maintain temperature and shorten life due to corrosion and leaks. Therefore, the treated water is used in the processing plants 226, the layer houses 228 and the evaporative cooling systems 230 to prevent scale formation and to sanitize and kill algae, bacteria and fungus. Evaporative cooling systems are well known in the art, such as the Chore-Time Turbo-Cool evaporative cooling system sold by Chore-Time Equipment of Indiana USA, and utilize cooling pads which absorb water which is used to cool air blown into the pullet and layer houses for temperature control, as is well known in the art. Applicant has discovered benefits from using its treated water in connection with evaporative cooling systems, since it washes off scale and kills algae, bacteria and fungus so that the air quality of the cooling air blown into the pullet and layer houses is improved, maintenance on the evaporative cooling system is reduced, and the useful life of the cool cells is extended.

The well water used in the process includes calcium which has been precipitated out and the oxidation process converts this calcium from calcium carbonate to calcium bicarbonate so that the calcium remains in solution. Applicant has learned that preventing calcium from precipitating out of the water and keeping the calcium in solution provides many health benefits to poultry.

In testing done at several pullet houses, one using the inventive method and one using standard water, over an 18 week cycle the poultry drinking the oxidized ionized water which retained calcium in solution showed an average 3.66% increase in weight as compared to the poultry drinking the standard water. There was also a decrease of 17.72% in mortality. The drinker cups 224 using the inventive method showed no algae growth. Cartridge filters used to filter untreated well water had to be replaced an average of twice per eighteen weeks, as compared to an average of once per week prior to using the inventive method. Also better feed conversion resulted in feed savings. Labor savings were also realized in eliminating the necessity of hand cleaning the pullet drinkers, flushing out lines or super chlorinating to remove algae from the water distribution system and the savings from fewer cartridge replacements. The processing plant also had less down time in its plant boilers and lines to remove scale and repair leaks. In the layer houses, the inventive method resulted in higher egg production, better egg hardness and better feed conversion.

The inventive method oxidizes the water to break down organics and precipitate out metals, filters out undesirable particles that have been precipitated out of solution by the oxidation process, sanitation to kill any remaining algae and bacteria and conditioning to lower the surface tension of the water and keep anything remaining in solution. Therefore, the inventive method removes iron, manganese and sulfur, removes scale buildup and prevents new scale from forming and kills fungus, bacteria and algae.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

These examples and description will suggest many variations and alternatives to one of ordinary skill in this art. All these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims.

For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each single dependent claim format which creates a dependency from a prior antecedent-possessing claim other than the specific claim listed in such dependent claim below (e.g. claim 6 may be taken as alternatively dependent from any of claims 2–5, claim 4 may be taken as alternatively dependent from claim 3; etc.).

What is claimed is:

1. A cooling water system having a condensing water loop, comprising:
   a condenser system;
   a cooling tower having water sides surfaces and a basin;
   a water treatment apparatus comprising:
      a pump having:
         an inlet port and an outlet port, said inlet port being connected to an incoming water line for supply water to be treated, drawn from the condensing water loop of the cooling water system;
      a first electrode ionization chamber comprising:
         an inlet port and an outlet port, said pump outlet port communicating with said first electrode ionization chamber inlet port; and
         two ion-producing electrodes spaced apart, wherein at least one of said ion-producing electrodes comprises a titanium electrode coated with ruthenium for the purpose of creating nascent oxygen, molecular oxygen, ozone, hydroxyl and perhydroxyl radicals, and hydrogen peroxide in said water; and
      a second electrode chamber comprising:
         two ion-producing electrodes spaced apart; and
         an inlet port and an outlet port; and
   a quantity of water to be treated, the quantity of water to be treated being located in the condensing water loop between the cooling tower and the water treatment apparatus, wherein the electrode chambers communicate with the condensing water loop such that water in the loop is circulated through the electrode chambers.

2. A system according to claim 1, wherein at least one of the two electrodes of the second chamber comprises a solid copper bar.

3. A system according to claim 1, wherein the water treatment apparatus further comprises an automatic backwashing multimedia sediment filter, the filter having an inlet port and an outlet port, said pump outlet port being connected to said filter inlet port and said filter outlet port being connected to said first electrode ionization chamber inlet port.

4. A system according to claim 3, wherein said first electrode ionization chamber outlet port is connected to said second electrode chamber inlet port, wherein the outlet port of said second electrode chamber is connected to the condensing water loop to enable water discharged from the apparatus to be dispersed uniformly and completely over the water side surfaces of the cooling tower.

5. A system according to claim 3, with the cooling tower further comprising a spray dispersal system connected to at least one of the electrode chambers so that water which exits the water treatment apparatus can be dispersed uniformly and completely over the water side surfaces of the cooling tower.

6. A system according to claim 5, wherein the spray dispersal system is connected to the first electrode chamber.

7. A system according to claim 6, further comprising a make-up water source, the make-up source being connected to the second electrode chamber inlet.

8. A system according to claim 1, further comprising a water pickup pipe located in the cooling tower basin and connected to the inlet port of the skid mounted pump.

9. The system according to claim 1, wherein the quantity of water comprises metals and minerals.

10. The system according to claim 1, wherein the water treatment apparatus, when the quantity of water is pumped through the water treatment apparatus, dissolved oxygen and ozone are created at the electrodes.

11. A water system, comprising:
a water treatment apparatus comprising:
a first ionization chamber comprising:
two ion-producing electrodes spaced apart, at least one electrode comprising a titanium electrode coated with ruthenium for the purpose of creating nascent oxygen, molecular oxygen, ozone, hydroxyl and perhydroxyl radicals, and hydrogen peroxide in water; and
an inlet port and an outlet port, said inlet port being capable of being connected to an incoming water line for supplying make-up water to be treated by said chamber, and
a quantity of water to be treated, the quantity of water to be treated being located in the water system, the water system being designed to pump the quantity of water into the water treatment apparatus.

12. A system according to claim 11, said water treatment apparatus further comprising:
a pump having an inlet port end an outlet port, said inlet port being connected to an incoming water line for supplying water to be treated by said apparatus from a condensing water loop of a cooling water system having a condenser and a cooling tower having a basin and water side surfaces;
an automatic backwashing multimedia filter having an inlet and an outlet port, wherein the pump outlet port is connected to the inlet port of the automatic backwashing multimedia filter;
a second ionization chamber comprising:
two ion-producing electrodes spaced apart, at least one electrode being comprised of solid copper;
an inlet port and an outlet port, the outlet port of said filter being connected to the inlet port of the second ionization chamber and the outlet port of said ionization chamber being connected to a condensing water loop for dispersal of the treated water completely and uniformly over the water side surfaces of a cooling tower.

13. A system according to claim 11, the water treatment apparatus further including a skid mounted pump and an automatic backwashing filter and an ozonator, wherein the water from a condensing water loop is treated by passing it through the filter, the ozonator and the ionization chamber.

14. A water treatment system according to claim 13, further including a cooling tower deck water dispersal system constructed and arranged to reintroduce the treated water into the water loop by dispersing it down the sides of the cooling tower.

15. The system according to claim 11, wherein the quantity of water comprises metals and minerals.

16. The system according to claim 11, wherein the water treatment apparatus, when the quantity of water is pumped through the water treatment apparatus, dissolved oxygen and ozone are created at the electrodes.

17. An evaporative cooling system of the type blowing air over a wet surface, the improvement comprising:
oxidation apparatus for oxidizing water prior to supplying the water to the evaporative cooling system, wherein the oxidation apparatus utilizes a titanium electrode coated with ruthenium for the purpose of creating nascent oxygen, molecular oxygen, ozone, hydroxyl and perhydroxyl radicals, and hydrogen peroxide in said water,
ionization apparatus for ionizing the water with copper ions prior to supplying the water to the evaporative cooling system,
a quantity of water to be treated, the quantity of water to be treated being located in to evaporation cooling system between the wet surface and the oxidation apparatus and the ionization apparatus, and
a means for pump the quantity of water into the oxidation apparatus and the ionization apparatus.

18. The evaporative cooling system of claim 17 for use in connection with a contained environment used to raise animals.

19. The evaporative cooling system of claim 18 for use in connection with pullet houses.

20. The evaporative cooling system of claim 18 for use in connection with layer houses.

* * * * *